US007028849B2

(12) United States Patent
Froud

(10) Patent No.: US 7,028,849 B2
(45) Date of Patent: Apr. 18, 2006

(54) SCREEN APPARATUS

(75) Inventor: Colin Froud, Kent (GB)

(73) Assignee: CSO Technik Limited, Kent (GB)

( * ) Notice: Subject to any disclaimer, the term of this patent is extended or adjusted under 35 U.S.C. 154(b) by 0 days.

(21) Appl. No.: 10/478,870

(22) PCT Filed: Apr. 18, 2002

(86) PCT No.: PCT/GB02/01791

§ 371 (c)(1),
(2), (4) Date: Sep. 16, 2004

(87) PCT Pub. No.: WO02/085488

PCT Pub. Date: Oct. 31, 2002

(65) Prior Publication Data

US 2005/0035050 A1 Feb. 17, 2005

(30) Foreign Application Priority Data

Apr. 23, 2001 (GB) .................................. 0109812

(51) Int. Cl.
*B01D 29/68* (2006.01)
*E03F 5/14* (2006.01)
*E02B 5/08* (2006.01)

(52) U.S. Cl. ...................... 210/408; 210/409; 210/162; 210/797; 210/209; 210/220

(58) Field of Classification Search ................ 210/408, 210/409, 162, 797, 209, 210
See application file for complete search history.

(56) References Cited

U.S. PATENT DOCUMENTS

| | | | | |
|---|---|---|---|---|
| 3,357,567 A * | 12/1967 | Wake | ........................ | 210/408 |
| 3,620,371 A * | 11/1971 | Valdespino | ................. | 210/117 |
| 3,739,912 A * | 6/1973 | Miller, Jr. | ................... | 210/758 |
| 3,982,499 A * | 9/1976 | Frankl | ........................ | 119/450 |
| 4,412,920 A * | 11/1983 | Bolton et al. | .............. | 210/409 |
| 4,468,325 A * | 8/1984 | Yock et al. | ................. | 210/408 |
| 5,462,673 A * | 10/1995 | Piers | .......................... | 210/739 |
| 6,270,684 B1 * | 8/2001 | Schloss | ...................... | 210/784 |
| 6,354,442 B1 * | 3/2002 | Obst | .......................... | 210/353 |

FOREIGN PATENT DOCUMENTS

| | | | |
|---|---|---|---|
| GB | 2235393 | * | 3/1991 |
| GB | 2297769 | * | 8/1996 |
| JP | 54-009065 | * | 1/1979 |

* cited by examiner

*Primary Examiner*—Thomas M. Lithgow
(74) *Attorney, Agent, or Firm*—Clark & Brody

(57) ABSTRACT

Screen apparatus comprising a screen (10) which allows fluid to pass through it whilst providing a barrier to non-fluid matter in the fluid. A jet outlet (22) is arranged to direct a jet of fluid across that side of the screen (10) on which such matter would otherwise tend to collect when the apparatus is in use.

20 Claims, 2 Drawing Sheets

SCREEN APPARATUS

TECHNICAL FIELD

The present invention relates to screen apparatus comprising a screen which allows fluid to pass through it whilst providing a barrier to non-fluid matter in the fluid.

BACKGROUND

Such a screen is used in sewage storm overflow apparatus. In one previously proposed such construction the screen comprises a multiplicity of bars which are parallel to one another and which are spaced from one another across the screen. One problem encountered with this prior construction is that non-fluid matter, for example debris, can be trapped against the bars as fluid flows between them, so that after a prolonged period the non-fluid matter can build up and inhibit the free-flow of fluid through the screen.

SUMMARY OF THE INVENTION

The present invention seeks to provide a remedy.

Accordingly the present invention is directed to screen apparatus having the construction as set out in the opening paragraph of the present specification, in which the apparatus further comprises a jet outlet which is arranged to direct a jet of fluid across that side of the screen on which such matter would otherwise tend to collect when the apparatus is in use.

The jet of fluid prevents the screen from clogging up, or at least increases the time it takes to be clogged up. This in turn reduces the load on the screen, being the total force exerted by fluid on the screen.

Such screen apparatus is particularly advantageous when it is constructed as sewage storm overflow apparatus.

In the event that non-fluid matter, such as for example a disposed hypodermic syringe, approaches the screen during storm conditions it will either be swept away by the jet of fluid before it contacts the screen, or, should it reach the screen, it will be rolled over by the jet of fluid across the screen until it is cleared therefrom.

A particularly inexpensive embodiment of the present invention uses water as the fluid of the jet. In a preferred construction, therefore, the jet outlet is connected to receive water from a source thereof.

Advantageously the source of water comprises a tank of water. This can be filled with water in a very convenient manner by being an open tank placed below the screen to catch the fluid flowing therethrough. Suitable passageways and a pump may be provided to transfer fluid from the tank to the jet outlet under pressure.

An air injector may be connected to inject air into the water so that the jet of fluid comprises a mix of water and air. This provides the advantage of increased turbulence to improve the scouring action of the jet of fluid to clear non-fluid matter from the screen, and helps to float the screenings. At the same time it improves the biological breakdown of the sewage in the event that the screen apparatus constitutes sewage storm overflow apparatus. This aids the cleaning process.

The screen apparatus may be installed alongside a channel along which sewage or other fluid flows, in such a manner that in overflow conditions the fluid will reach the screen. It is preferable that the screen extends in the direction of flow as defined by the channel. It is also preferable that the jet outlet is arranged to direct the jet of fluid in that direction, that is to say that the direction of this jet should be generally parallel to the direction of the flow as defined by the channel.

The channel may be defined at one side thereof by a weir. The screen may be located along the top of the weir. It may be recessed from the inside surface of the weir which faces the channel. This affords the advantage that the jet of fluid can be at least partly contained within the screen. It is then preferable for a deflector to be arranged in the screen at a position downstream of the jet outlet to deflect the fluid of the jet into the mainstream of the fluid flowing along the channel. The screen may be curved so that it has a generally semi-circular cross-section open on a diameter thereof. One readily obtainable material for the screen is sheet, for example, metal sheet, uniformly perforated, for example with 6 mm diameter holes.

The deflector may be an integral part of the screen, or it may be a separate component which is secured to the screen. Either way, it is desirable for the deflector to be impervious to fluid to reduce the likelihood that non-fluid matter will be pressed and held against it by the jet of fluid.

The deflector may be constructed so that it acts as a venturi, to improve the flow of the jet.

An example of screen apparatus embodying the present invention will now be described with reference to the accompanying drawings, in which:

BRIEF DESCRIPTION OF THE DRAWINGS

FIGS. 1 to 3 show sewage storm overflow apparatus comprising a screen 10 in the form of a metal sheet 12 perforated uniformly over its area with 6 mm diameter holes 14. The ratio of open area created by these holes across the sheet to solid area is about 1:1. The screen allows fluid to pass through it whilst providing a barrier to non-fluid matter such as debris in the sewage. The sheet 12 is curved so that it has a generally semi-circular cross-section as shown in FIG. 1, the diameter across the semi-circle being entirely open. The screen could then be said to constitute a basket. At the same time, the sheet 12 as curved in this fashion is generally elongate with a lower edge secured to an upright wall 16 which constitutes a weir. The said diameter slants at an angle of about 30 degrees to the wall 16.

Figure 1:
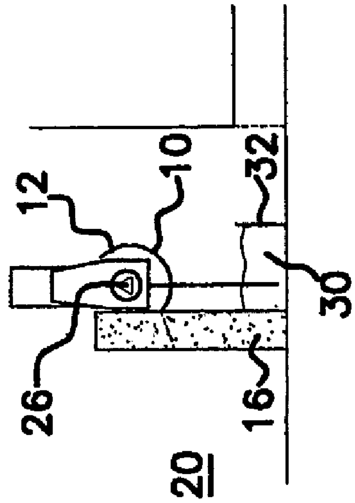
FIG. 1 shows a cross-sectional elevational view of the apparatus.

The wall 16 has a cut-away 18 along its top edge, so that the top edge of the wall 16 is at a lower level in this cut-away region than it is elsewhere. It will be appreciated that the wall is built in this way, and that it is not to be inferred from the words "cut-away" that anything has been removed. The lower edge of the screen 10 is secured to the wall 16 along the upper edge and to one side thereof at the cut-away region 18. The other side of the wall 16 defines one side of a channel 20 along which sewage waste flows.

A jet outlet 22 is secured to one end of the screen 10. The jet outlet 22 is provided with a venturi 24 upstream thereof. A pump 26 is connected via a passageway 28 to receive water 30 from a tank 32 positioned below the screen 10, and to pump that water through the venturi 24 and out through the jet outlet 22. The jet outlet 22 is arranged to direct a jet of water through the interior of the screen 10.

The venturi 24 is provided with an inlet 34 to draw air therethrough into the water passing through the venturi 24 so that air is mixed with the water in a mixing compartment 35 before it exits the jet outlet 22 to constitute the jet of fluid.

DETAILED DESCRIPTION OF THE PREFERRED EMBODIMENTS

Figure 3:
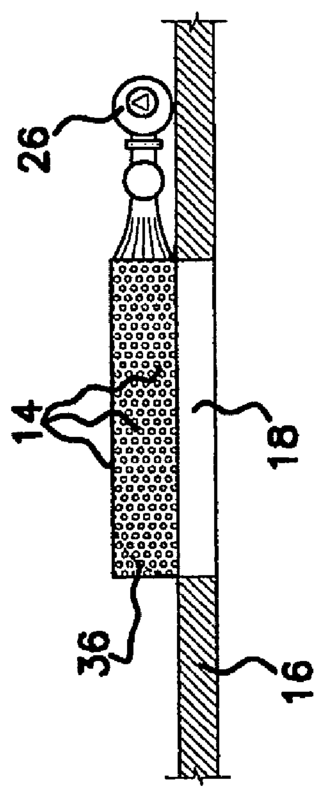
FIG. 3 shows a plan view of the apparatus shown in FIG. 1.

The other end of the screen 10 is provided with a deflector 36 which, as is most evident from FIG. 3, is curved to deflect the jet of fluid at that end of the screen 10 into the main flow of the fluid waste in the channel 20.

A float switch 38 is provided in the tank 32, and is electrically connected by circuitry (not shown) to trigger operation of the pump 26.

In normal conditions sewage waste flows through the channel 20 on its way to a treatment plant, for example. In the event of storm conditions, the level of the waste water rises until it starts to tip over the top edge of the wall 16 at the cut-away portion 18. The water is freely able pass through the holes 14 and falls into the tank 32.

If the storm conditions are sufficiently bad, the tank 32 will fill with water 30 and eventually trigger the float switch 38. This operates the pump 26, drawing water from the tank 32, which water is then pumped through the venturi 24, drawing air in through the inlet 34 and forming a jet of water/air mix, or wash water, to issue as a jet stream from the jet outlet 22. The jet stream flows along the inside of the screen 10 and is deflected by the deflector plate 36 back into the main flow of the waste sewage in the channel 20.

Any non-fluid matter in the sewage fluid which approaches the screen 10 is thrust along the screen 10 by the jet stream from the jet outlet 22 and is then deflected by the deflector plate 36 back into the main flow of the waste sewage in the channel 20. It is thereby prevented from clogging the holes 14 of the screen 10. In the event that non-fluid matter should reach the screen 10 it will be rolled therealong by the jet stream to the deflector plate 36 where it will be urged out into the main flow.

Figure 2:
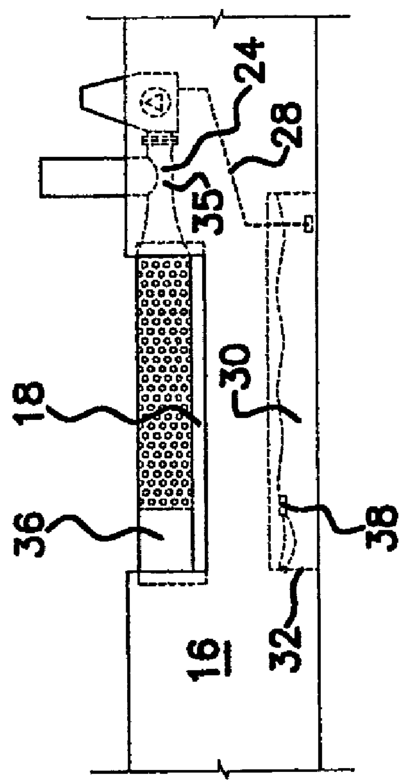
FIG. 2 shows a side-elevational view of the apparatus shown in FIG. 1.

A number of variations to the construction in the FIGS. 1 to 3 are shown respectively in FIGS. 4 to 7. Thus in FIG. 4 the median bisector of the U defined by the semi-circular cross-section of the screen 10 is generally parallel to the wall 16, with the base of the U lowermost. Furthermore, that side of the screen 10 which is further from the wall 16 is extended to a level significantly higher than the top of the wall 16 at the cut-out 18.

Figure 5:
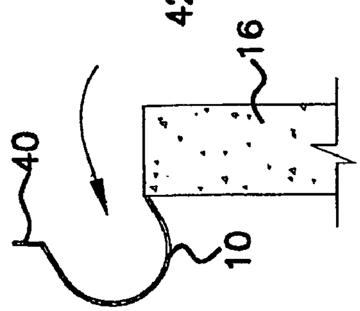
Figure 4:
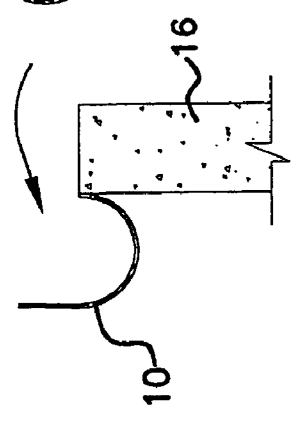

In FIG. 5, the edge of the screen 10 further from the wall 16 is extended by a generally upright lip 40.

Figure 6:
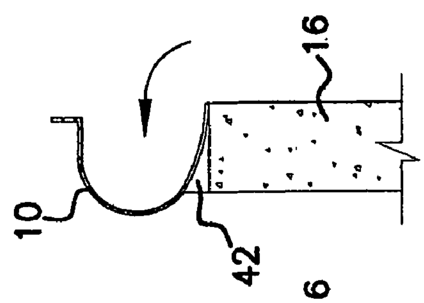

In the modification shown in FIG. 6, the said bisector is generally horizontal, and a portion of the screen 10 close to the base of the U rests on a support plate 42.

Figure 7:
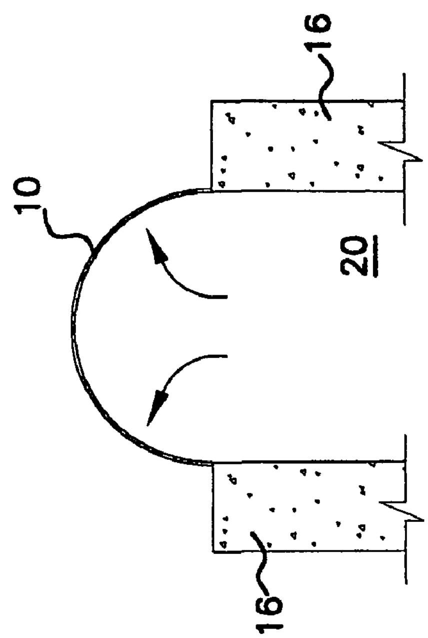
FIGS. 4 to 7 show respective cross-sectional views of parts of modifications to the apparatus shown in FIGS. 1 to 3.

In the modification shown in FIG. 7 the U of the screen's cross-section is entirely inverted with opposite ends of the U supported respectively on two weirs 16 spaced apart from one another with the channel 20 defined therebetween.

Numerous variations and modifications to the illustrated constructions may occur to the reader without taking the resulting construction outside the scope of the present invention. For example, the deflector plate 36, could be made as an integral part of the screen 10 instead of as an insert therefor. It would, however, in that case be necessary for the holes 14 to be absent from the deflector plate region of the screen, or else those holes 14 should be filled in in that region. Unfiltered water could be used for the jet of fluid, and a standard pump could be used without air injected. The perforated screen cross-section could be continuously reduced from the pump end to the deflector plate end to improve its self-cleaning function.

The invention claimed is:

1. Screen apparatus comprising a channel (20) along which fluid flows, a screen (10) which allows fluid to pass through it whilst providing a barrier to non-fluid matter in the fluid characterised in that said screen is positioned adjacent said channel to extend along a portion of said channel between ends of said screen such that during overflow conditions a portion of said fluid overflowing said channel is directed onto said screen while said screen remains in communication with said channel such that said matter entrained in said portion of said fluid is returned to said channel during said overflow conditions, the apparatus further comprising a jet outlet (22) located at one of said ends of said screen and arranged to direct a jet of fluid across that side of the screen (10) on which such matter would otherwise tend to collect toward the other of said ends during said overflow conditions.

2. Screen apparatus according to claim 1, characterised in that the jet outlet (22) is a water jet outlet.

3. Screen apparatus according to claim 2, characterised in that the water jet outlet (22) is connected to receive water from a source (32) thereof.

4. Screen apparatus according to claim 3, characterised in that the source of water comprises a tank (32) of water.

5. Screen apparatus according to claim 4, characterised in that the tank (32) of water is an open tank (32) placed below the screen (10) to catch the fluid flowing therethrough.

6. Screen apparatus according to claim 5, characterised in that the apparatus is further provided with a pump (26) to transfer fluid from the tank (32) to the jet outlet (22).

7. Screen apparatus according to claim 2, characterised in that an air inlet (34) is connected so that the jet of fluid comprises a mix of water and air.

8. Screen apparatus according to claim 1 comprising a sewage storm overflow apparatus.

9. Screen apparatus according to claim 1, characterised in that the screen (10) extends in the direction of flow as defined by the channel (20).

10. Screen apparatus according to claim 9, characterised in that the jet outlet (22) is arranged to direct the jet of fluid in said direction.

11. Screen apparatus according to claim 1, characterised in that the channel (20) defined at one side thereof by a weir (16).

12. Screen apparatus according to claim 11, characterised in that the screen (10) is located along the top of the weir (16).

13. Screen apparatus according to claim 11 characterized in that the screen (10) is recessed from the inside surface of the weir (16) which faces the channel (20).

14. Screen apparatus according to claim 1 characterised in that a deflector (36) is arranged in the screen (10) at a position downstream of the jet outlet (22) to deflect the fluid of the jet into the mainstream of the fluid flowing along the channel (20).

15. Screen apparatus according to claim 14, characterised in that the deflector (36) is impervious to fluid to reduce the likelihood that non-fluid matter will be pressed and held against it by the jet of fluid.

16. Screen apparatus according to claim 14 characterised in that the deflector (36) constructed so that it acts as a venturi, to improve the flow of the jet.

17. Screen apparatus according to claim 1, characterised in that the screen (10) comprises a sheet (12).

18. Screen apparatus according to claim 17, characterised in that the sheet (12) is a metal sheet (12).

19. Screen apparatus according to claim 17 characterized in that the sheet (12) is uniformly perforated.

20. Screen apparatus according to claim 19, characterised in that the sheet (12) is uniformly perforated with substantially 6 mm diameter holes.

* * * * *